United States Patent [19]

Maus

[11] Patent Number: 5,014,426
[45] Date of Patent: May 14, 1991

[54] BALANCING MACHINE SUPPORT AND METHOD

[75] Inventor: Otfri-d Maus, Darmstadt, Fed. Rep. of Germany

[73] Assignee: Schenck Auto-Services-Gerate GmbH, Fed. Rep. of Germany

[21] Appl. No.: 337,911

[22] Filed: Apr. 14, 1989

[30] Foreign Application Priority Data

May 24, 1988 [EP] European Pat. Off. ............ 88108247

[51] Int. Cl.$^5$ .............................................. B23P 13/00
[52] U.S. Cl. .................................... 29/897.3; 29/469; 73/475
[58] Field of Search ....................... 29/150, 897, 897.3, 29/469; 73/473, 475, 476, 477

[56] References Cited

U.S. PATENT DOCUMENTS 1,593,783  7/1926  Stresau .................................. 29/150

Primary Examiner—Joseph M. Gorski
Attorney, Agent, or Firm—Connolly and Hutz

[57] ABSTRACT

A support is described for a bearing arrangement of a balancing machine for determining the effect of unbalance in two measuring planes. The support has a spindle that holds the component to be balanced in two planes. Vibration force pickups with a relative position indicator are provided for the determination of the fraction of the unbalance attributed to the individual plane as a function of size and magnitude. The design of a support integrally as box profile on which the spindle is laterally arranged is proposed to prevent the problems thusfar caused by the supports which influence the measured results in their reproducibility.

2 Claims, 2 Drawing Sheets

BALANCING MACHINE SUPPORT AND METHOD

BACKGROUND OF THE INVENTION

The present invention relates to a process for the production of a support of a bearing arrangement for a body to be balanced in a balancing machine to determine the effect of unbalance in two measuring planes and to a support produced by this process: The support has an auxiliary shaft holding the component to be balanced in two planes as well as vibration force pickups and a relative position indicator for the determination of the unbalance fraction as a function of position and magnitude attributed to the individual planes.

In order to balance rotating components not having a shaft of their own such as turbine wheels, gear wheels, wheels of vehicles and grinding wheels, for example, a balance machine must be provided with an auxiliary shaft on which these components can be fastened for the balancing procedure. It is then not important whether the auxiliary shaft extends in a vertical or horizontal direction but, for such components, it is essential that they are inspected for unbalance, if possible, in a position in which they are later arranged in assembled state together with other components in a then complete machine or in which their unbalance can be simply corrected. For example, for grinding wheels and motor vehicle wheels, a horizontal auxiliary shaft arrangement may be advantageous, particularly when these balancing machines are employed for balancing such rotating elements after a certain time of operation, such as operation of the vehicle wheels or wear of the grinding wheels, for example.

In order to obtain a reliable bearing arrangement of the auxiliary shaft, this shaft is usually supported at two bearing sites whereby the end of the auxiliary shaft holding the body to be balanced projects beyond one bearing arrangement so that, as a result, a so-called over-mounted bearing arrangement of the component to be balanced is possible.

In measuring for unbalance, the component, firmly connected to the auxiliary shaft, is made to rotate and the actions of the mass forces of the unbalance present in the component are picked up by vibration converters arranged in the bearing planes of the auxiliary shaft. The mass forces of the unbalance are separately indicated for each plane by means of a relative position indicator so that for each plane, the required unbalance equalization can be conducted in the appropriate relative position and with the appropriate weight. In addition to vibration path pickups, vibration force pickups such as piezocrystals or strain measuring strips are particularly suitable as vibration converters.

In order to prevent measuring errors caused by the bearing arrangement, such auxiliary shafts or spindles must be supported very accurately which is connected with high adjustment expense. In particular, for spindles which are supported horizontally and are to hold an over-mounted component to be balanced, the influence of the cantilevered weight on measuring errors caused by improper bearing support should not be underestimated. Frequent adjustment steps must be conducted to determine whether such balancing machines can still be used, for example, in gasoline stations and repair shops with their very uneven operations. These types of bearing supports are individually bolted together with the housing of the balancing machine, containing, for example, the drive motor and the evaluation electronics. This results in measuring errors because of a different pretension of bearing support and housing as a function of the screw tightening moment. These types of screw connections also may loosen somewhat over time which influences the measuring accuracy.

SUMMARY OF THE INVENTION

With the above as background, one object of the present invention is a particularly economical production process for a support of a bearing arrangement for components to be balanced in which the possibilities of errors attributed to the support of the bearing arrangement are eliminated. The support is both problem-free and simple. The support may be formed by bending a plate into a U-shaped profile and subsequently welding-in a support carrier positioned to run parallel to the web of the U-profile. The support carrier interconnects two vibration-capable zones formed by the legs of the U-profile. Such integrity may also be produced by welding sheet metal sides to a flat plate resulting in a U-profile. The support carrier may then be secured to the sides. This process according to the invention guarantees that the two vibration-capable zones of the legs run exactly parallel to each other and that both are similarly connected with the web of the U-profile and similarly with the interconnecting support carrier. As a result of this integrity, all errors caused by the arrangement of two separate supports in the force of one spindle are eliminated.

The auxiliary shaft holds the component to be balanced in two planes. Vibration force pickups are provided and a relative position indicator determines the unbalance fraction attributed to the individual plane as a function of position and magnitude. The arrangement of the drive end of the auxiliary shaft according to the invention with only one vibration-capable leg zone of the integral box-shaped profile provides for considerable weight reduction in relation to the weight of the auxiliary shaft. Now the auxiliary shaft in order to hold the component to be balanced ends at one selected leg and with its holding part extends away from the box profile. This provides a simple and reliable arrangement of the vibration force pickups between the support carrier and the web when piezocrystals are employed as vibration force pickups. This also provides a simple connection of the vibration force pickups with the vibration-capable parts of the legs when measuring strips are used as vibration force pickups without influence of the auxiliary shaft on the space between the vibration-capable leg parts. It is advantageous when the welded-in support carrier has a U-shaped cross-section particularly when the auxiliary shaft is connected with the vibration-capable part of a leg by bolting.

When the drive end of the auxiliary shaft is welded to the vibration-capable leg zone of a leg of the U-shaped profile, the support carrier per se, welded between the two vibration-capable leg zones, may also have other contours, for example, the support carrier may be designed as a rod or pipe having any cross-sectional shape or as double T-carrier.

The auxiliary shaft extends horizontally away from the integral, box-shaped profile. This embodiment of the horizontal auxiliary shaft is especially advantageous in balancing machines employed in repair shops and wherein the component to be balanced rotates about a horizontal axis of rotation in its assembled and in-use state.

The arrangement of the vibration force pickups having the same distance to the symmetry line of the web plate running parallel to the legs represents an essential fabrication-related simplification. In the production of the closed box profile, markings for the vibration force pickups to be accommodated are applied without the necessity of subsequent expensive measurements on the web.

The arrangement of bores in the web plate for the connection to a housing of a balancing machine does not reduce the rigidity of the integral box profile. This method for the simplest connection of such a web plate to an existing housing of a balancing machine does not have a negative effect on the balancing accuracy of the balancing machine.

With a horizontal auxiliary shaft, the web plate can be designed as a balancing machine housing, and the drive motor and the evaluation unit can be arranged inside the U-profile. Also the web plate may be welded or bolted to a machine housing in which the drive and evaluation units are accommodated. This compact construction is especially advantageous when one machine housing in which a drive motor and evaluation units are accommodated, for example, can serve several testing devices.

The testing device provides for a support for a bearing arrangement of components to be balanced in which the integral refinement of the support eliminates measured results influenced by the support. The support can be used as a balancing machine and the drive motor and evaluation unit can be accommodated in the U-profile. Such support may be used in balancing grinding wheels. The support can also be detachably or undetachably connected to a frame or to a housing of a balancing machine. The spindle arranged on the support may be detachably connected with the support which is useful when several spindles cooperate with one single support for the purpose of balancing different rotors. The spindle may be welded to the support when only one type of rotor is to be balanced. The support with the web of the U-profile according to the invention may be connected to horizontal or vertical substrates so that the spindle fastened to the substrate may have a horizontal or vertical axis of rotation.

BRIEF DESCRIPTION OF THE DRAWING

Novel features and advantages of the present invention in addition to those noted above will become apparent to persons of ordinary skill in the art from a reading of the following detailed description in conjunction with the accompanying drawing wherein similar reference characters refer to similar parts and in which.

DETAILED DESCRIPTION OF THE INVENTION

Figure 1:
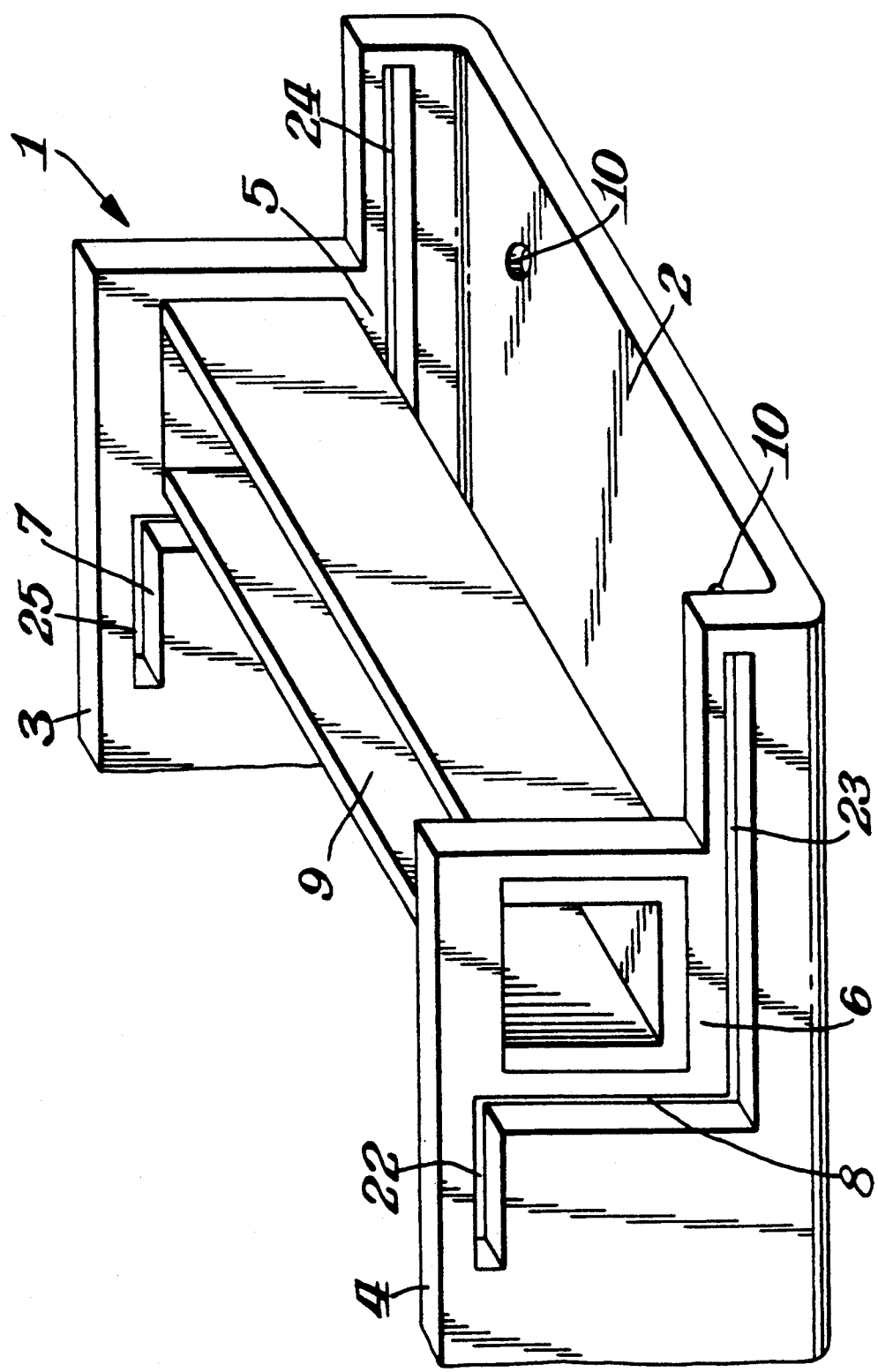
FIG. 1 is a pictorial view of a balancing machine support, according to the present invention.

Referring in more particularlity to the drawing, FIG. 1 illustrates a support 1 shaped from a sheet metal plate by bending two edges parallel to each other to a U-profile consisting of a web plate 2 and of legs 3,4. The legs extend parallel to each other and contain vibration-capable zones 5,6. The vibration-capable zones 5,6 are produced by punching out angular slots 7, 8, as shown.

A support carrier 9 extends between the vibration-capable zones 5,6 and is secured to these zones by welding, for example. Support carrier 9 has a U-shaped profile and provides a rigid integral box. As a result of the angular slots 7,8, carrier 9 transmits any produced unbalance vibrations to vibration pickups associated with the support. A spindle 16 is connected with the vibration-capable zone 5 of the leg 3 by bolting or welding, for example. In this regard, support carrier 9 is closed by a plate 30 at the end thereof next to leg 3 and the spindle 16 is attached to that plate, as explained more fully below.

Figure 2:
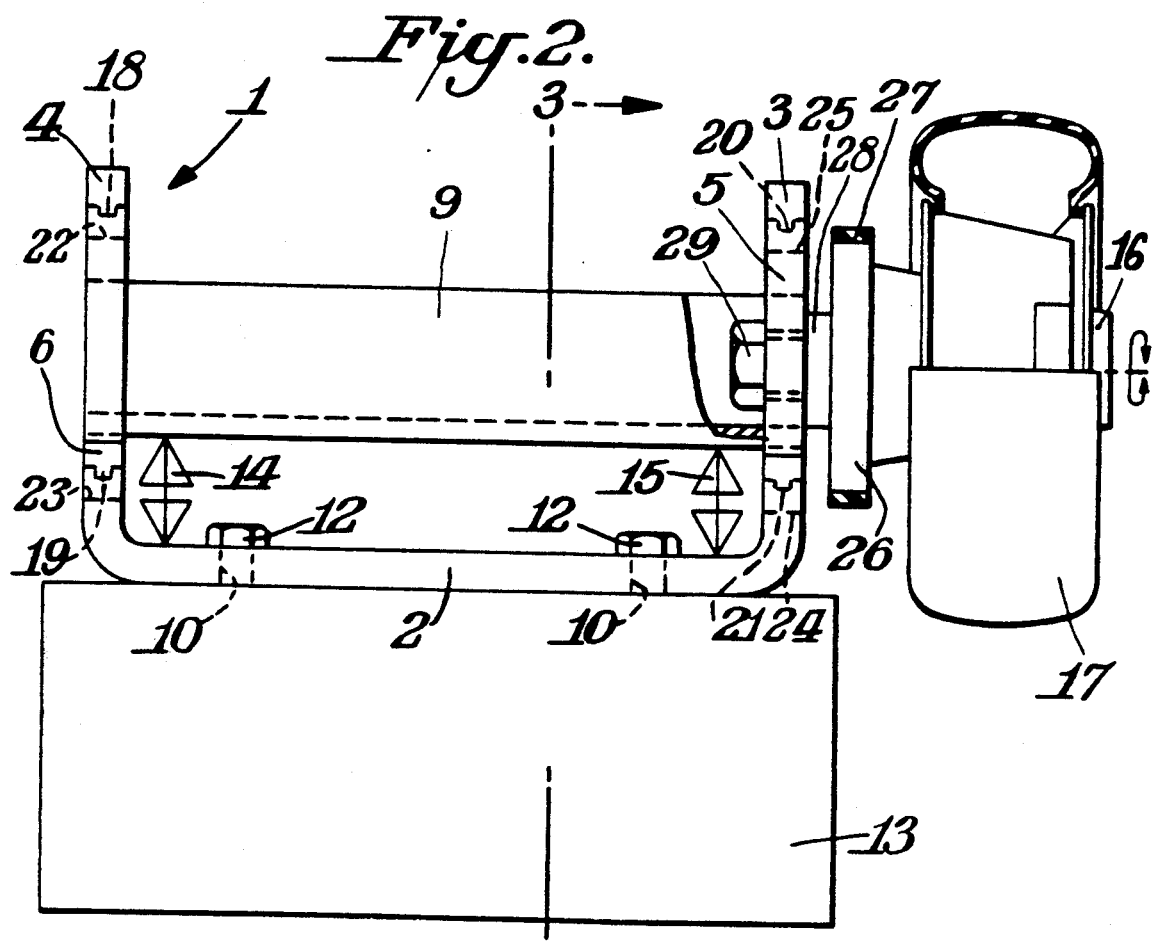
FIG. 2 is a right end elevational view of the support shown in FIG. 1 with selected portions shown in section.
Figure 3:
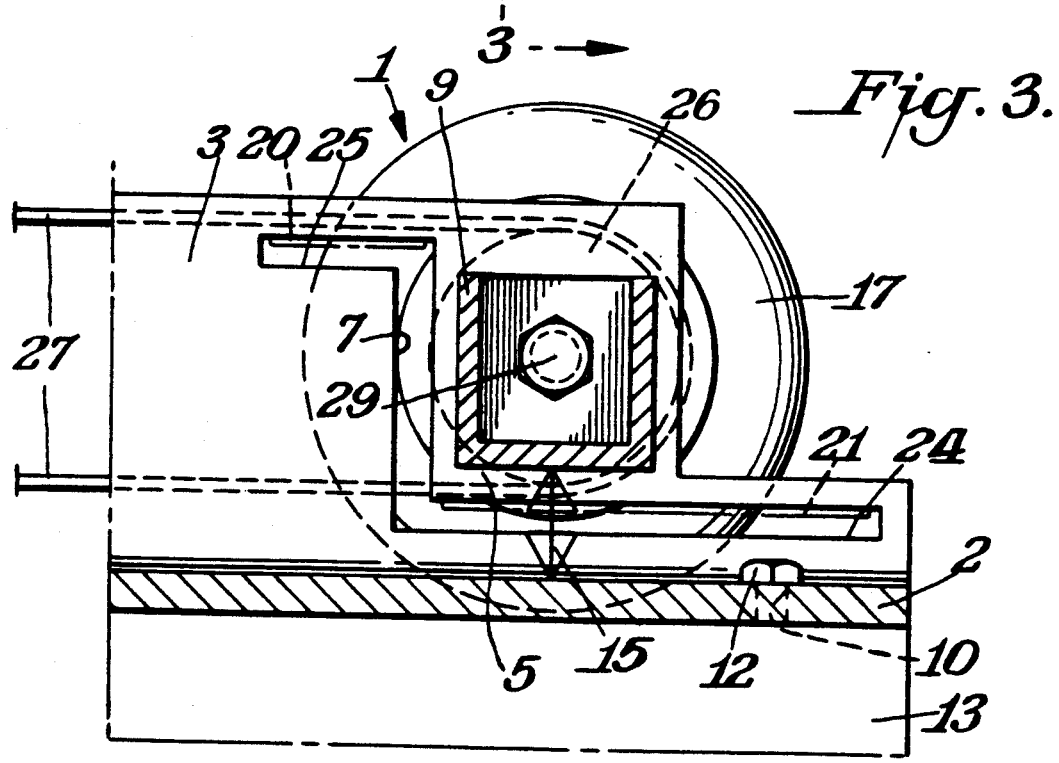
FIG. 3 is a sectional view taken along line 3—3 of FIG. 2.

Web plate 2 of support 1 has several openings 10 for connecting the complete support 1 to any substrate by means of screws and the like. As a result of the integral construction, foreign vibrations which might falsify the measured result cannot enter or leave the support. FIG. 2 shows the bolting arrangement of the support 1 via screws 11, 12 which pass through the holes 10 to the machine bed 13. Connecting the support to the machine bed 13 may also be accomplished by welding instead of bolting.

In the exemplified embodiment, vibration force pickups 14, 15, such as piezoelectric crystals, are clamped between the web plate 2 and the support carrier 9. As a result of the vibrating support of a spindle 16 as a bearing arrangement for a component to be balanced, such as a motor vehicle wheel 17, the vibrations caused by unbalance are transmitted to the integral support 1. The vibration-capable zones 5, 6 enable a vibration of the support carrier 9. The piezocrystals as a result of a stress change in connection with a relative position indicator (not shown) via the forces to be equalized and existing in two planes in the motor vehicle wheel 17 equalize the effects of unbalance according to size and direction.

Instead of piezocrystals 14, 15 strain measuring strips 18, 19, 20, 21 may be arranged on horizontal legs 22, 23, 24, 25 of the angle slots 7,8 in order to also record the vibration information for further processing in electric measuring values.

As shown, the spindle 16 has a drive end 26 around which a gear belt 27 is wrapped to transfer power from a driven motor (not shown). The drive end 26 has a support shaft 28 which is connected by means of locking nut 29 with the vibration-capable zone 6 of the leg 4. Instead of the locking nut 29, the support shaft 28 may also be welded to the vibration-capable zone 5 to completely prevent possible errors as a result of a different pretension of the locking nut 29.

What is claimed is:

1. A process of producing a support for a bearing shaft of a balancing machine comprising the steps of: taking a flat plate lying in a plane, forming two parallel sides that upwardly extend in the same direction from the plane of the flat plate, forming an angular slot in each of the two parallel sides, with the slots being mirror image duplicates of one another and defining a vibration-capable leg zone in each of the two parallel sides, each of the formed slots including at least a first portion parallel to the plane of the flat plate and a second portion at an angle thereto, and securing a support carrier having a U-shaped profile to and between the vibration-capable leg zones and parallel to the plane of the flat plate.

2. The process as in claim 1 wherein the step of forming an angular slot further includes forming a third slot portion in each of the two parallel sides with each third slot portion being parallel to the first slot portion and connected thereto by the second slot portion.

* * * * *